United States Patent [19]

Hake et al.

[11] Patent Number: 4,530,406
[45] Date of Patent: Jul. 23, 1985

[54] SPRING CLAMP SHANK ASSEMBLY

[75] Inventors: Kenneth A. Hake, Tipton; Gregory A. Hamilton, Beloit, both of Kans.

[73] Assignee: Kent Manufacturing Co., Inc., Tipton, Kans.

[21] Appl. No.: 490,831

[22] Filed: May 2, 1983

[51] Int. Cl.³ ............... A01B 61/04; A01B 35/24
[52] U.S. Cl. ................................ 172/705; 172/708
[58] Field of Search ........... 172/705, 710, 264, 265, 172/707, 708

[56] References Cited

U.S. PATENT DOCUMENTS

| 301,545 | 7/1884 | Wheeler | 172/265 |
|---|---|---|---|
| 317,971 | 5/1885 | Carrothers | 172/508 |
| 444,986 | 1/1891 | Bloominger | 172/265 |
| 1,041,975 | 10/1912 | Dennis | 172/265 |
| 1,225,949 | 5/1917 | French | 172/705 |
| 1,290,446 | 1/1919 | White | 172/462 |
| 2,625,869 | 1/1953 | Buhr | 172/292 |
| 2,679,793 | 6/1954 | Rolf et al. | 97/165 |
| 2,712,781 | 7/1955 | Rolf | 97/47.84 |
| 2,739,518 | 3/1956 | Rolf | 97/47.84 |
| 2,771,018 | 11/1956 | Zahn | 97/47.84 |
| 2,906,353 | 9/1959 | Rogers | 172/265 |
| 3,084,749 | 4/1959 | Anderson | 172/268 |
| 3,098,529 | 7/1963 | Wade et al. | 172/265 |
| 3,098,531 | 7/1963 | Hunter | 172/710 |
| 3,173,494 | 3/1965 | Padwick | 172/265 |
| 3,223,175 | 12/1965 | Twidale | 172/264 |
| 3,258,076 | 6/1966 | Goenke | 172/710 |
| 3,314,487 | 4/1967 | Kopaska et al. | 172/710 |
| 3,365,002 | 1/1968 | Jacobs | 172/710 |
| 3,414,252 | 12/1968 | Frager et al. | 267/1 |
| 3,431,982 | 3/1969 | Wassill | 172/710 |
| 3,470,966 | 10/1969 | Padwick | 172/710 |
| 3,480,086 | 11/1969 | Groenke | 172/710 |
| 3,486,566 | 12/1969 | Nja | 172/705 X |
| 3,493,055 | 2/1970 | Van Peursem | 172/708 |
| 3,529,673 | 9/1970 | Morris | 172/266 |
| 3,536,146 | 10/1970 | Groenke | 172/264 |
| 3,575,243 | 4/1971 | Mark et al. | 172/710 |
| 3,606,928 | 9/1971 | Quanbeck | 172/265 |
| 3,700,038 | 10/1972 | Essex | 172/265 |
| 3,744,572 | 7/1973 | Zeltwanger et al. | 172/710 |
| 3,825,073 | 7/1974 | Gardner et al. | 172/710 |
| 3,981,367 | 9/1976 | Mydels | 172/265 |
| 4,011,916 | 3/1977 | Neal et al. | 172/710 |
| 4,078,615 | 3/1978 | Kelly | 172/705 |
| 4,128,130 | 12/1978 | Green | 172/705 |
| 4,177,865 | 12/1979 | Lewison | 172/705 |
| 4,193,456 | 3/1980 | Ankenman | 172/705 |
| 4,210,210 | 7/1980 | Ankenman | 172/272 |
| 4,261,423 | 4/1981 | Williamson | 172/705 |
| 4,463,813 | 8/1984 | Long | 172/705 |

FOREIGN PATENT DOCUMENTS

| 87803 | 11/1959 | Denmark . | |
|---|---|---|---|
| 194144 | 1/1907 | Fed. Rep. of Germany . | |
| 731210 | 8/1932 | France . | |
| 1129076 | 1/1957 | France . | |
| 1390347 | 1/1965 | France | 172/705 |

OTHER PUBLICATIONS

Landoll Soil-Master, advertising brochure for Landoll Corp., Marysville, Kans., 1-1979.
Glencoe Soil Saver, advertising brochure for Glencoe Corp., Bloomington, Ill., 1979.

Primary Examiner—Richard J. Johnson
Attorney, Agent, or Firm—Litman, Day and McMahon

[57] ABSTRACT

A cultivating tool assembly for attachment to the tool bar of a cultivator frame utilizes an upright bracket for connection to the tool bar and an arm member pivotally connected to the mounting bracket and extending substantially horizontally therebehind. A coil spring biasing arrangement is also pivotally connected to the mounting bracket and extends in parallel relation to the arm member, connecting to a cradle forming a leverage arm extending upwardly from an outer end of the arm member. A tool shank having an elongate, generally horizontally extending upper end is affixed to the arm member and curves outwardly and downwardly in a semi-circular arrangement, culminating at a tool tip. The biasing arrangement is adjustable to vary the amount of force applied by the coil spring between the mounting bracket and cradle to control the running depth of the tool and to set the trip pressure.

3 Claims, 6 Drawing Figures

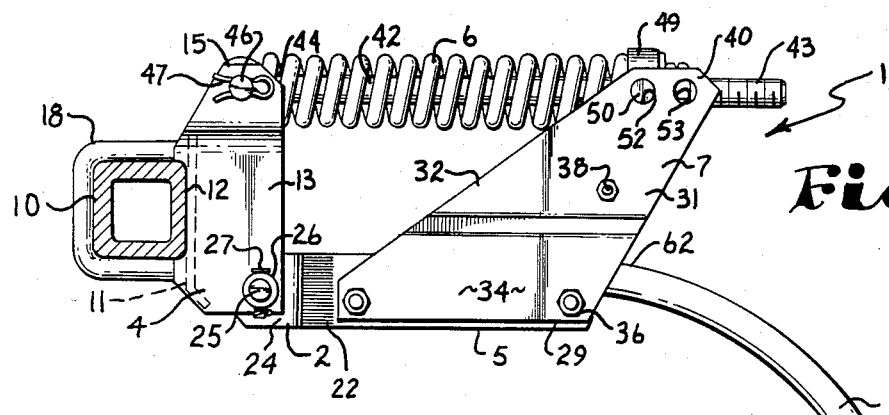
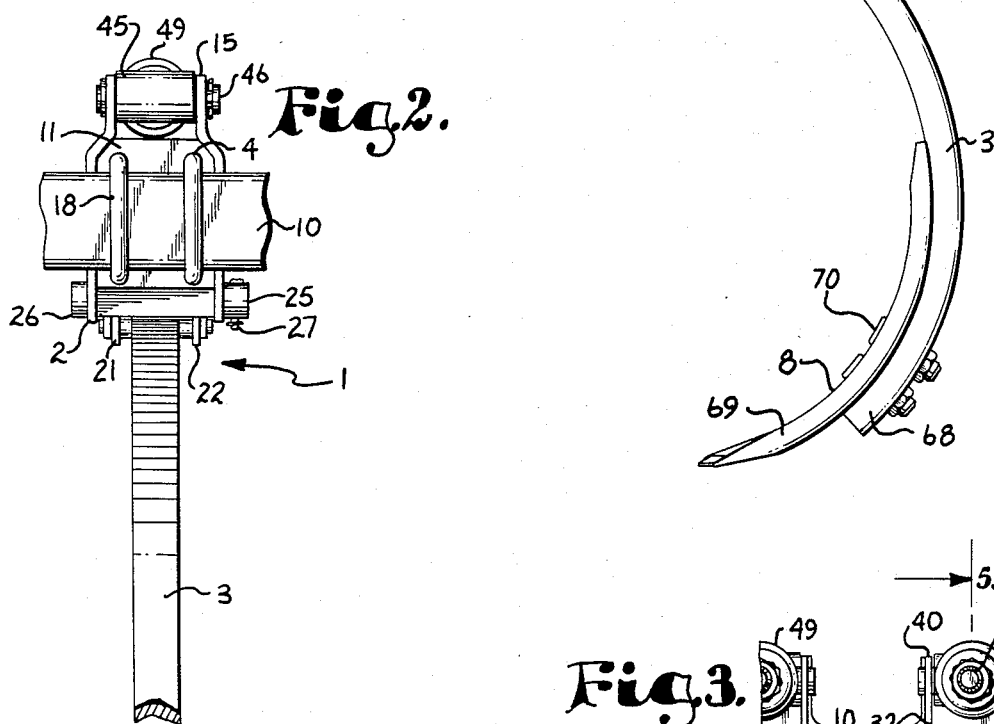
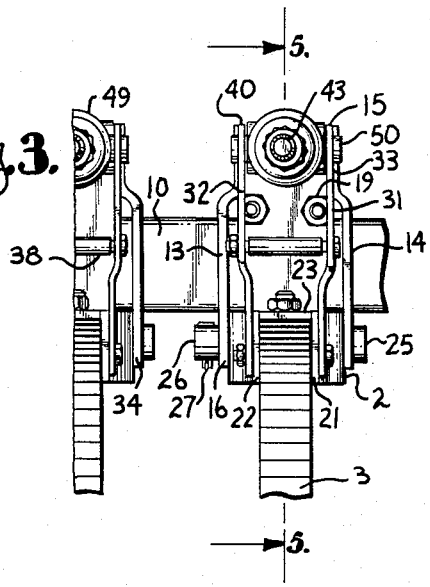
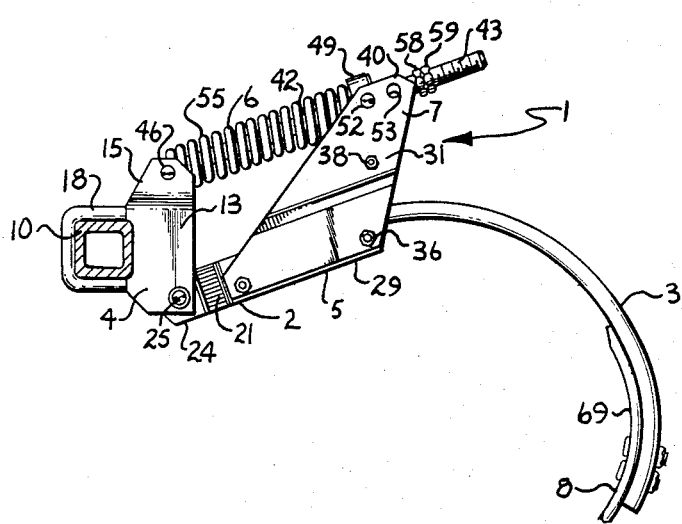

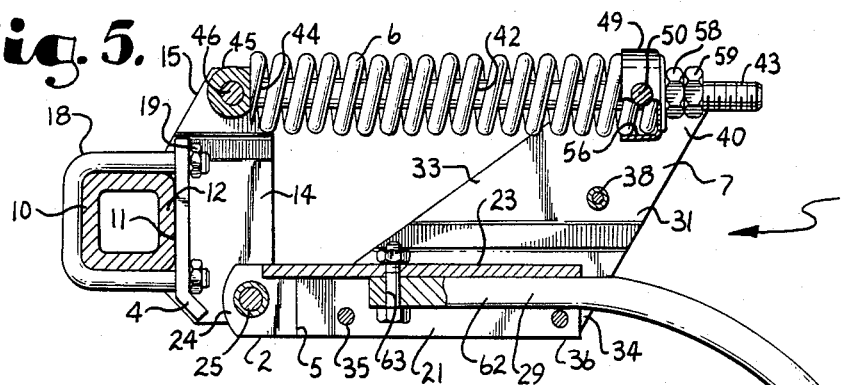
Fig. 5.
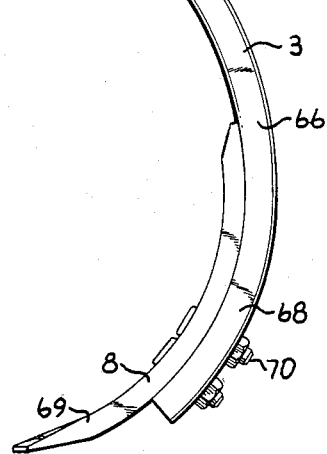
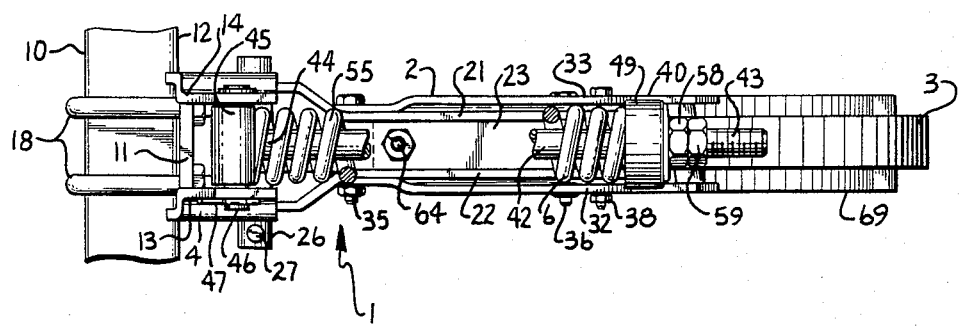
Fig. 6.

SPRING CLAMP SHANK ASSEMBLY

This invention relates to a mounting for a tillage tool and in particular, to a spring biased mounting assembly.

BACKGROUND OF THE INVENTION

Various mounting means for tillage chisels are known and are generally intended to permit flexing of the chisel shank as it plows into the earth in order to trip and ride upwardly over rocks and other obstacles in the field, rather than breaking. In many types of cultivator tools, the chisel shank is arranged in a curving, spring-like configuration which is intended to give when encountering an obstacle, yet provide sufficient strength for plowing. To provide additional downward biasing action and relief for the chisel shank, the mountings generally include another spring arrangement, usually a coil or compression spring, which is arranged vertically to urge the chisel shank downwardly, yet provide upward give or tripping for obstacle clearance.

Many tool mounting structures are complex, heavy, and extend upwardly from the area of connection with the implement tool bar whereby the mountings may interfere with other tools to be mounted on the implement frame. Particularly with the contemporary emphasis upon single pass cultivation, fuel conservation practices induce the operator and manufacturer to mount as many tools as possible on a single cultivator frame, such as a combination of coulter or disc gangs, chisel shanks and a spike or tine finishing drag. A single pass of such an implement often readies the field for planting.

OBJECTS OF THE INVENTION

The principal objects of the present invention are: to provide an improved cultivating tool mounting assembly utilizing spring means to provide a tool tip which tends to remain within the earth, yet trip upwardly upon encountering an obstacle; to provide such a tool mounting assembly which is mounted behind a tool bar to provide substantial clearance for agricultural leaves, stalks and other trash encountered during tillage operations; to provide such a tool mounting assembly having a horizontally positioned bias spring arrangment which is adjustable to provide depth variation of a cultivating tool; to provide such a mounting tool assembly having a tool shank with a substantial horizontal portion to provide a pulling rather than a pushing effect on the tool tip; to provide such a tool mounting assembly having a removable and replaceable cultivating tip; to provide such a tool mounting assembly having an easily removable and replaceable tool shank; and to provide such a tool mounting asssembly which is sturdy and efficient in use and particularly well adapted for its intended purpose.

Other objects and advantages of this invention will become apparent from the following description taken in conjunction with the accompanying drawings wherein are set forth, by way of illustration and example, certain embodiments of this invention.

DESCRIPTION OF THE DRAWINGS

FIG. 1 is a side elevational view of the tool mounting assembly and cultivator shank.

FIG. 2 is a fragmentary, end elevational view of the tool mounting assembly and cultivator shank.

FIG. 3 is an enlarged, fragmentary view of a rear portion of the tool mounting assembly.

FIG. 4 is a side elevational view of the tool mounting assembly and cultivator shank showing upward deflection.

FIG. 5 is an enlarged sectional view of the tool mounting assembly and cultivator shank taken along lines 5—5, FIG. 3.

FIG. 6 is a plan view of the tool mounting assembly.

DESCRIPTION OF THE PREFERRED EMBODIMENT

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1, FIG. 1, generally indicates a cultivating tool assembly embodying the present invention and including a tool mount 2 retaining a cultivator shank 3. The tool mount 2 generally comprises a mounting bracket 4 with a swingably mounted arm member 5 trailing therebehind and connected to a bias means 6 through a second arm member 7 to form a generally trapezoidal structure in which the arm member 5 and bias means 6 extend generally horizontal and in a parallel relationship. The cultivator shank 3 is generally semi-circular and curves downwardly to a cultivating tip 8 for engaging the earth.

In the illustrated example, the mounting bracket 4 is adapted to be secured to a tool bar 10 of a cultivator frame (not shown) in generally trailing relationship. The bracket 4 is substantially vertically oriented and includes a forward end plate 11 for abutting a rear wall 12 of the tool bar 10 and spaced side plates 13 and 14 extending rearwardly from the end plate 11 and having respective upper portions 15 and lower portions 16. The upper portions 15 mutually converge inwardly to form mounting ears for the bias means 6, and the lower portions 16 provide a mounting for the arm member 5. U-bolts 18 are positioned and spaced side-by-side about the tool bar 10 and extend through the forward end plate 11. Threaded ends of the U-bolts 18 are secured by nuts 19 to affix the forward end plate 11 to the rear wall 12 of the tool bar 10.

The arm member 5 is connected to the lower portions 16 of the mounting bracket 4 for upward and downward swinging movement, and in the illustrated example includes spaced side members 21 and 22 secured together and maintained in spaced, parallel relationship by a top bar 23, FIG. 5. The forward end 24 is pivotally attached to the lower portions 16 of the mounting bracket 4 by a pivot pin 25 suitably detachably affixed, as by a collar 26 and cross pin 27. The forward end 24 necks inwardly or converges so that the remainder of the arm member 5 is of a width to snugly accommodate the cultivator shank 3.

The arm member 5 includes a rearward portion 29 extending substantially horizontally and in trailing relationship to the mounting bracket 4 and carrying the second arm member 7 which extends angularly therefrom in a substantially vertical plane. In the illustrated example, the second arm member 7 is in the form of a cradle member 31 including spaced side walls 32 and 33, each in a generally triangular configuration. The side walls 32 and 33 respectively include lower portions 34 straddling and affixed to the arm member 5 by spaced mounting bolts 35 and 36. The side walls 32 and 33 are tapered inwardly so as to snugly accommodate the transverse dimension of the armmember 5. A through bolt and spacer arrangement 38 at respective mid portions of the side walls 32 and 33 provides additional rigidity to the cradle member 31. An upper or outer end 40 includes means for connection to a rearward portion of the bias means 6, as described hereinbelow.

In the illustrated example, the bias means 6 includes an elongate rod 42 having at least a rearward end portion 43 adapted for accepting a fastener, as by threading. A forward end 44 of the rod 42 is secured, as by welding, to a cross bushing 45, which is then swingably affixed to the upper portions 15 of the mounting bracket 4 as by a pivot pin 46 having opposite ends suitably secured by a spring clip 47. Thus, the rod 42 swings in a vertical plane from the mounting bracket 4.

The rearward end 43 of the rod 42 is adjustably connected to the upper or outeer end 40 of the cradle member 31 which, in the illustrated example, includes a bushing 49 having trunions 50 protruding diametrically therefrom and extending through selected pairs of spaced first and second pairs of apertures 52 and 53 in the upper or outer end 40.

A coil spring 55 is sleeved about the rod 42 and extends from the bushing 45 at the mounting bracket 4 to the bushing 49 at the cradle member 31. Preferably, the bushing 49 has a cup-shaped interior 56, FIG. 5, to hold and retain the outer end of the coil spring 55. An adjustment nut 58 is threaded onto the rod rearward end 43 and bears against the bushing 49 to select and apply compressive force on the coil spring 55. The adjustment nut 58 bears against the bushing 49 to set both the resiliency of the coil spring 55 and the upward or downward positioning of the cultivating tip 8. When the adjustment mount 58 is tightened or rotated toward the mounting bracket 4 on the rod 42, the effective length between the mounting bracket 4 and cradle member 31 is decreased, thereby tending to swing both the arm member 5 and rod 42 upwardly and pull the cultivating tip 8 upwardly also. Conversely, when the adjustment nut 58 is loosened or rotated rearwardly on the rod 42, the effective length of the rod 42 between the mounting bracket 4 and the cradle member 31 is increased, resulting in less compression of the coil spring 55 and making for easier resilient movement and further tending to swing the rod 42 and arm member 5 downwardly to extend the cultivating tip 8 further into the earth.

Although the adjustment nut 58 is the primary adjustment means for the effective length of the rod 42, secondary adjustment for preloading can be accomplished by inserting the bearing trunions 50 into the second or rearward set of apertures 53, thereby also increasing the effective length of the rod 42 and decreasing preloading on the coil spring 55. In the forward apertures 52, preload is greater to provide greater resistance to compressive movement. To secure the adjustment nut 58 at a selected location, a lock nut 59 is threaded on the rod rearward end 43 rearwardly of the adjustment nut 58.

In the illustrated example, the cultivator tool shank 3 has an elongate, generally horizontally extending upper end 62, FIG. 5, secured to the arm member 5. The shank upper end 62 has an upper surface abutting against the top bar 23 of the arm member 5 and is received snugly between the side members 21 and 22. The cradle mounting bolt 36 is spaced downwardly from the top bar 23 a distance commensurate with the thickness of the shank upper end 62 so that the mounting bolt 36 provides a passageway with the top bar 23 and forms a fulcrum for the shank upper end 62, FIG. 5, thereby increasing the effective length of the shank upper end 62. A bore 63 extends upwardly through the shank upper end 62, and a bolt 64 extends therethrough to attach the shank upper end 62 to the arm member 5.

The shank upper end 62 extends parallel to the arm member 5 a short distance therebeyond and then begins to curve downwardly and rearwardly at a semi-circular mid portion 66. The mid portion 66 continues to curve downwardly and turn forwardly and terminates at a shank tip 68 situated below and generally behind the arm member 5. A reversible tool tip 69 is removably and replaceably affixed to the shank tip 68 as by mounting bolts 70 for replacement when excessively worn or broken.

Preferably, the cultivator shank 3 describes an arc segment having an axis of curvature positioned substantially under and substantially rearwardly of the pivot pin 25 effecting increasing the length of the shank upper end 62. The horizontal portion of the shank upper end 62 in combination with the arm member 5 and the gradual arcuate angle of the mid portion 66 culminating at the forward end of the tool tip 69 provides a gradual attack angle to produce a pulling effect rather than a pushing effect on the shank 3. The gradual attack angle and positioning of the tool tip 2 substantially behind and below the pivot pin 25 creates a downward suction on the tool tip 69 during cultivation operations which tends to keep the tool tip 69 running at a consistent tillage depth rather than solely relying upon pressure of the bias means 6. Preferably, the horizontal shank upper end 62 equals about twenty percent of the total length of the combined cultivator shank 3 and tip 8. In the illustrated example, the cultivating tip 8 tapers at an approximate twenty degree angle to a chisel edge whereby sufficient downward pressure on the cultivating tip is maintained during operation, yet there remains a sufficient arc of the combined tip 8 and shank 3 to permit tripping over obstacles, such as stones, in the path of the shank 3.

The arrangement of the cultivator shank 3 relative to the arm member 5 provides a significant advantage over prior spring trip mounts because the force necessary to cause the shank 5 to trip upwardly when encountering obstacles remains relatively constant through the entire path of deflection, up to the point of tripping. Through preloading of the deflection resistance pressure at the adjustment nut 58 and selection of a pair of the two pairs of apertures 52 and 53, a substantial preload can be induced at the tool tip 69, such as in the order of 1700 lbs of torque so that the tip remains running at depth in hard, compacted soil. During deflection, as when encountering an obstacle, the tip 69 tends to stay in the ground during drafting until the tip 69 is deflected rearwardly a substantial distance.

After substantial rearward deflection of the tip, the arm member 5 begins to rotate upwardly, or trip, so that the tip 69 can pass over obstacles without breaking. As the spring 55 compresses, the resistance remains relatively constant and the tip 69 is urged back into the soil after passing over the obstacle.

It is to be understood that while one form of this invention has been illustrated and described, it is not to be limited to the specific form or arrangement of parts herein described and shown, except insofar as such limitations are included in the following claims.

What is claimed and desired to secure by Letters Patent is as follows:

1. A cultivating tool assembly for attachment to the tool bar of a cultivator frame and comprising:
    (a) a substantially vertical mounting bracket having a forward end plate for fastening to said tool bar and spaced side plates extending rearwardly from said end plate, said side plates having upper and lower portions;
    (b) an arm member having a forward end pivotally mounted to said bracket lower portions and having a rearward portion extending substantially horizontally therefrom;
    (c) a cradle member including spaced side walls mounted to and extending upwardly from said arm member rearward portion; said cradle member having an upper portion spaced above said arm member a distance generally equal to a distance between said bracket upper and lower portions;
    (d) a control rod having a forward end pivotally mounted to said bracket upper portions and having a threaded rearward portion extending generally horizontally therefrom and parallel to said arm member;
    (e) a bushing pivotally mounted to said cradle member upper portion with said control rod extending reciprocably therethrough, said control rod being mounted to said bracket and said bushing so as to be continuously positioned parallel to said arm member as said tool assembly intermittently deflects upwardly and downwardly;
    (f) an adjustment nut threadably affixed to said control rod and positioned rearwardly of said bushing, said nut being selectively positionable along the length of said rod to adjust the effective length thereof and raise and lower said arm member;
    (g) a coil spring sleeved about said control rod and positioned between said bracket and said cradle member, said spring biasing said cradle member outwardly with said bushing against said nut for absorbing upward shock transients imparted to said arm member; and
    (h) a tool shank having an elongate, generally horizontally extending upper end secured to said arm member and extending parallel thereto, and elongate and substantially semi-circular mid portion extending from said arm member and curving rearwardly, downwardly and forwardly, and a lower end having a tool tip attached thereto and positioned generally under said cradle member; whereby said tool shank tends to push forwardly and downwardly on said tool tip during use while providing a substantial ability to deflect upwardly and trip over obstacles.

2. A cultivating tool asssembly for attachment to the tool bar of a cultivator frame and comprising:
    (a) a mounting bracket adapted for connection to said tool bar and having first and second vertically spaced and generally aligned pivot portions;
    (b) a first arm member having a forward end pivotally mounted to said bracket first pivot portion and including a rearward portion extending therefrom;
    (c) a second arm member mounted to said first arm member and extending angularly upwardly therefrom in a substantially vertical plane, said second arm member having an outer mount spaced from said first arm member;
    (d) a bias means comprising a control rod pivotally connected to said bracket second pivot portion and having stop limiting means thereon to determine the working position of the tool, said control rod extending between said bracket second portion and said outer mount and extending substantially parallel to said first arm member, said bias means tending to urge said second arm member outwardly and downwardly of said bracket; said first arm member and control rod means being substantially continuously parallel to each other during upward deflection; and
    (e) a tool shank having an elongate, generally horizontally extending upper end affixed to said first arm member and extending parallel thereto, an elongate and substantially semi-circular mid portion curving rearwardly, downwardly and forwardly, and a cultivating tip; whereby said tool shank tends to push forwardly and downwardly on said tip while providing a substantial ability to deflect upwardly and trip over obstacles.

3. The tool assembly as set forth in claim 2 wherein:
    (a) said first arm member and said bias means are generally horizontally oriented when said tool assembly is in a non-deflected operational position.

* * * * *